(12) United States Patent
Orman

(10) Patent No.: US 9,046,341 B2
(45) Date of Patent: Jun. 2, 2015

(54) FISH MEASURING DEVICE AND METHOD THEREFORE

(76) Inventor: Darrell Patrick Orman, Stuart, FL (US)

(*) Notice: Subject to any disclaimer, the term of this patent is extended or adjusted under 35 U.S.C. 154(b) by 296 days.

(21) Appl. No.: 13/541,726

(22) Filed: Jul. 4, 2012

(65) Prior Publication Data
US 2014/0007443 A1  Jan. 9, 2014

(51) Int. Cl.
*G01B 3/10* (2006.01)
*A01K 97/00* (2006.01)

(52) U.S. Cl.
CPC .............. *G01B 3/1084* (2013.01); *A01K 97/00* (2013.01); *G01B 2003/1079* (2013.01)

(58) Field of Classification Search
CPC ....... A01K 99/00; A01K 97/00; A01K 97/14; G01B 3/02; G01B 3/1084; G01B 3/10
USPC ............................ 33/511, 759, 760, 549, 551
See application file for complete search history.

(56) References Cited

U.S. PATENT DOCUMENTS

| | | | | |
|---|---|---|---|---|
| 1,474,804 A * | 11/1923 | Tyrrell | | 33/567 |
| 2,603,474 A * | 7/1952 | Mandolf et al. | | 177/233 |
| 2,750,184 A * | 6/1956 | Warndahl | | 177/127 |
| 2,959,884 A * | 11/1960 | Lemay | | 43/43.12 |
| 4,665,620 A | 5/1987 | Osteen | | |
| 4,753,031 A * | 6/1988 | Owen | | 43/54.1 |
| 4,965,954 A | 10/1990 | Cavazos | | |
| D407,461 S | 3/1999 | Creel | | |
| 5,922,999 A * | 7/1999 | Yang | | 177/148 |
| 6,115,932 A * | 9/2000 | Fedora | | 33/758 |
| 6,217,077 B1 | 4/2001 | Priebe | | |
| 6,415,521 B1 * | 7/2002 | Schnell | | 33/511 |
| 6,560,913 B1 | 5/2003 | Liao | | |
| 6,571,505 B1 | 6/2003 | Poiencot, Jr. | | |
| 6,765,155 B1 * | 7/2004 | Gray | | 177/148 |
| 6,769,212 B2 | 8/2004 | Grayson | | |
| 6,959,499 B2 | 11/2005 | Bini | | |
| 7,412,794 B2 | 8/2008 | Smith | | |
| 7,665,220 B1 * | 2/2010 | Gee | | 33/511 |
| 7,815,530 B2 | 10/2010 | Cannata | | |
| 8,141,262 B1 | 3/2012 | Lee | | |
| 2012/0204474 A1 * | 8/2012 | Mihara | | 43/55 |

FOREIGN PATENT DOCUMENTS

CA  2547115 A1 * 11/2006

OTHER PUBLICATIONS

Winding type fishing tape with measuring scale Tape length 8mm Tape width 25mm, available at http://www.alibaba.com/product-tp/114517645/MULTI_JOINT_FISHING_ROD/showimage.html?newId=114517645&pn=1&pt=10&t=12&cids=[May 7, 2012 3:50:39 PM] May 7, 2012.

* cited by examiner

*Primary Examiner* — Christopher Fulton
(74) *Attorney, Agent, or Firm* — The Concept Law Group, P.A.; Scott D. Smiley; Mark C. Johnson

(57) ABSTRACT

A device for measuring the length of a fish that includes fastener and a measuring tape, the fastener including a distal end and a proximal end, opposite to the distal end, and that is attached to a proximal end of the fish, the measuring tape being coupled to the fastener and having a proximal end, a distal end, and a length separating the proximal and distal ends, with the distal end of the measuring tape being located at least at a distal end of the fish to expose a fish length, the measuring tape also having distance indicators along the measuring tape length and extends downward and away from the distal end of the fastener.

18 Claims, 4 Drawing Sheets

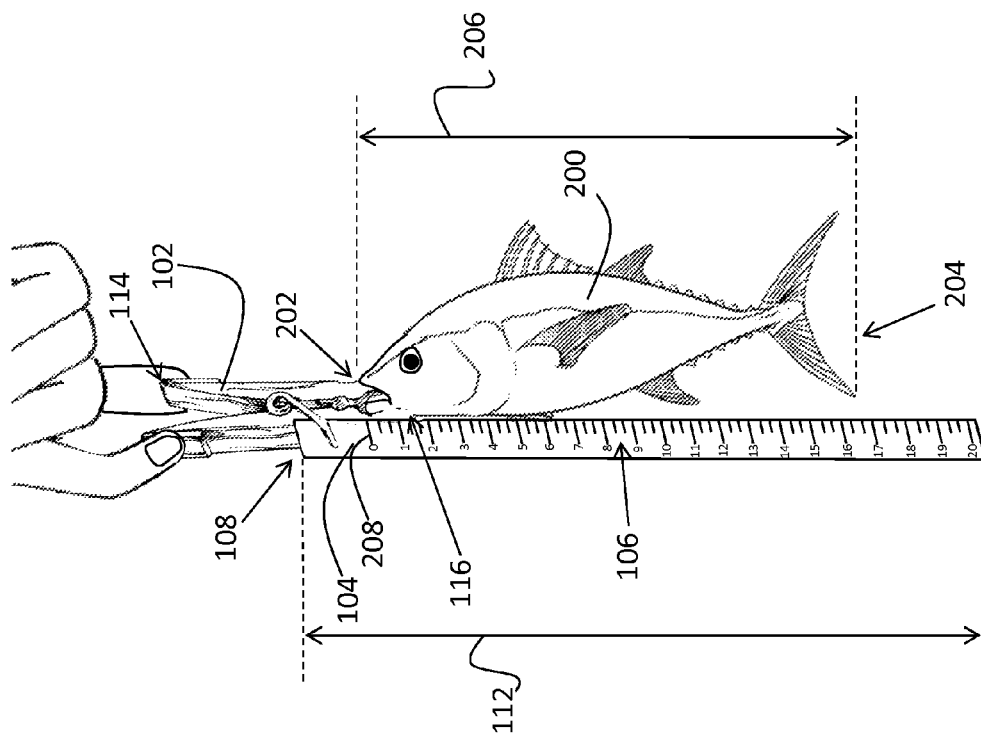
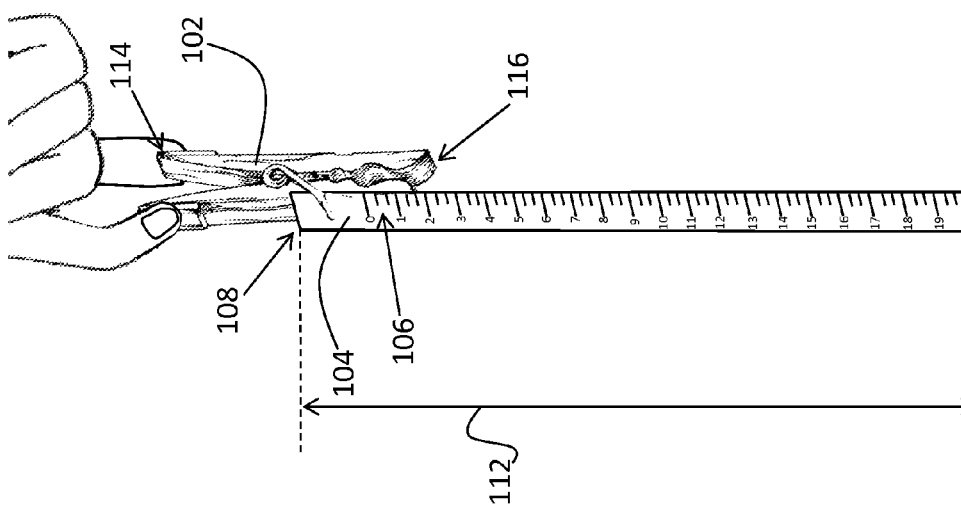

FISH MEASURING DEVICE AND METHOD THEREFORE

FIELD OF THE INVENTION

The present invention relates generally to measuring the length of a fish, and more particularly relates to a method and device for holding a fish and measuring the length of a fish, simultaneously.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Fish measurement is the measuring of the length of individual fish and of various parts of a fish anatomy. This quantifiable data is used in many areas of ichthyology, including taxonomy and fisheries biology. Standard length refers to the length of a fish measured from the tip of the snout to the posterior end of the last vertebra or to the posterior end of the mid-lateral portion of the hypural plate. Simply put, this measurement generally excludes the length of the caudal fin, but in other embodiments, may include the caudal fin. Furthermore, this length is generally a straight-line measure, and not measured over the curve of the body.

Fishing is the activity of trying to catch fish, typically caught in the wild. Techniques for catching fish include hand hooking, gathering, spearing, netting, angling, and trapping. The term fishing may be applied to catching other aquatic animals such as mollusks, cephalopods, crustaceans, and echinoderms. It is often desirable to measure the length of the fish that are caught to avoid fines for keeping fish that do not meet a minimum size requirement, to collect scientific data, and simply for personal satisfaction and bragging rights amongst recreational hunters.

One prior-art device for measuring the length of a fish is U.S. Pat. No. D448,687 (Landwerlen), commercially known as the "Redfish Board". The Redfish Board is 32" long, made from aircraft aluminum with lines, numbers and letters embossed into the surface, and resembles a rigid yardstick with an "L" shaped bend at one end. The Redfish Board is used by laying a fish on its surface, with one end of the fish touching the "L" portion of the Board, which is the zero mark. One can then look at the other end of the fish and read the embossed marking on the Board, indicating the length of the fish. The Redfish Board, however, has several disadvantages. Since the Redfish Board is 32" long and rigid, it is difficult to carry, store, and use, especially on boats having small areas within which to work. Also, the Redfish board is used in a horizontal plane, which causes it to also suffer from the problem of a live fish moving and sliding either off of the Board or away from the zero mark, causing false readings. Additionally, because the measuring is accomplished by laying the fish on the Board's measuring surface, and fish inherently produce slime, the Redfish Board must be cleaned each time it is used.

The same manufacturer of the Redfish Board also manufactures similar devices sold under the trade name "Bluwater Measuring Board." The Bluwater Measuring Board is provided in a blue color, and is available in lengths of 38" and 42", making them even less portable than the above described Redfish Board.

Another prior-art device is commercially known as the "Golden Rule" and is similar to the above-mentioned Redfish Board and Bluwater Measuring Board. The Golden Rule is a ruler made of anodized a gold-aluminum-based material with lines, numbers, and letters embossed into the surface. The Golden Rule suffers from all of the above-mentioned disadvantages of the prior-art. Although it is available in lengths of 12", 18", and 22", shorter than the previously mentioned prior-art measuring devices, it is still difficult to store, carry, and use a length of "L" shaped aluminum in those lengths. Additionally, while the shorter length may prove slightly easier to store and use, it is then limited to the size fish that it can measure. Many of the above described devices are also made with materials that are relatively heavier and denser than water. As most of the above described devices are utilized around, or in connection with, a body of water, they are susceptible to sinking into the body of water.

A tape-measure-type device provides an advantage of compact storing area. However, prior-art tape-measure-type devices consist of a thin strip containing the numbers and markings, which are small and difficult to read. These prior-art devices also do not provide an easy way to measure from the very tip of one end of the fish to the other. One would have to hold the fish and both ends of the tape measure to get an accurate measurement of the length of the fish. Furthermore, most, if not all, of the prior-art tape-measure-type devices require a separate and independent assembly, or structure, to hold and support the fish before the length can be determined.

Even though the above cited fish measuring systems address some of the needs of the market, a device that is portable and provides efficient and accurate quantifiable data for wild game is still desired. Therefore, a need exists to overcome the problems with the prior art as discussed above.

SUMMARY OF THE INVENTION

The invention provides a fish measuring device and method therefore that overcomes the hereinafore-mentioned disadvantages of the heretofore-known devices and methods of this general type and that this operable to measure the length of a fish easily and effectively.

With the foregoing and other objects in view, there is provided, in accordance with the invention, a device for measuring the length of a fish that has a fastener and a measuring tape coupled to the fastener. The fastener has a distal end and a proximal end, opposite to the distal end and is attachable to a proximal end of the fish. The measuring tape has a proximal end, a distal end, and a length separating the proximal and distal ends, with the distal end being located at least at a distal end of the fish to expose a fish length. The fastener also has distance indicators along the measuring tape length and extends downward and away from the distal end of the fastener.

In accordance with another feature, an embodiment of the present invention includes the fastener having at least two members coupled together, wherein the at least two members at least partially define a first space separating the at least two members when in an open position and a second space separating the at least two members when in a closed position, the second space being less than the first space.

In accordance with another feature, another embodiment of the present invention includes the proximal end of the fish being attached to the fastener when in the closed position.

In accordance with a further feature of the present invention, the fastener is a clothes-pin fastening mechanism.

In accordance with yet another feature of the present invention, the measuring tape has a zero mark located along the measuring tape length, wherein the zero mark is substantially aligned the proximal end of the fish.

In accordance with a further feature of the present invention, the measuring tape is foldable.

In accordance with yet another feature of the present invention, the distance indicators are evenly-spaced lines along the measuring tape length.

In accordance with a further feature of the present invention, the distance indicators include evenly spaced lines and incremented numbers.

In accordance with another feature of the present invention, a color of the distance indicators contrasts with a color of the measuring tape.

In accordance with another feature, an embodiment of the present invention also includes the measuring tape having a weight coupled to the distal end of the measuring tape.

In accordance with the present invention, a device for measuring the length of a fish includes a fastener with a distal end, a proximal end, the distal and proximal ends separated by a length, the fastener also having at least two members coupled together to at least partially define a first space separating the at least two members when in an open position and a second space separating the at least two members when in a closed position, the second space being less than the first space. The device also includes a measuring tape coupled to the fastener, with the measuring tape having a proximal end, a distal end, and a length separating the proximal and distal ends, having distance indicators along the measuring tape length, and extending downward and away from the distal end of the fastener.

In accordance with another feature, an embodiment of the present invention includes a zero mark substantially aligned with a portion of the fastener along the fastener length.

In accordance with a further feature of the present invention, the measuring tape is retractable and extendable.

In accordance with the present invention, a method for measuring a fish includes providing a fastener having a proximal end, a distal end, and a length separating the proximal and distal ends and a measuring tape coupled to the fastener, with the measuring tape having a proximal end, a distal end, and a length separating the proximal and distal ends, having distance indicators along the measuring tape length, and extending downward and away from the distal end of the fastener. The method also includes coupling a proximal end of a fish to the distal end of the fastener and visually determining a length of the fish by comparing a distal end of the fish to the distance indicators on the measuring tape.

In accordance with another feature, an embodiment of the present invention also includes coupling the proximal end of the fish to the distal end of the fastener such that the proximal end of the fish is substantially aligned with a zero mark located along the measuring tape length.

Although the invention is illustrated and described herein as embodied in a fish measuring device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

This invention is directed to a portable system and method for quantifying wild game, specifically fish, and provides a fastener and quantifying scale, e.g., a measuring tape, coupled together, to effectively and efficiently measure the length of a fish. The fastener is attached to one end of the fish and provides a reference point for observing and recording the length of the fish when the other end of the fish is compared with the quantifying scale. In some embodiments, the quantifying scale may include a flexible measuring tape efficacious for determining a length or distance. The quantifying scale may be oriented vertically with a proximal end that is positioned above a distal end. The proximal end of the measuring tape, or some portion close thereto, is coupled to the fastener that is supported by a user or a stand.

The quantifying scale may include a ribbon of cloth, plastic, fiber glass, or metal strip that displays a multiplicity of quantifying indicia for quantifying the length of a wild game. In some embodiments, the multiplicity of quantifying indicia may include a multiplicity of linear measurement markings in metric or United States measuring units. The fastener may provide a reference point for attaching the wild game to the proximal end, and also observing and recording the length of the wild game. However, in other embodiments, different empirical measurements may be observed and recorded from the quantifying scale, including, without limitation, the girth, weight, expansion, and retraction of the fish.

The fastener may include a clamp sufficiently sized and dimensioned to securely attach to a proximal end of the fish. The proximal end of the fish generally includes the mouth of the fish. In some embodiments, the fastening end may directly couple to the mouth or a snout of a fish. In other embodiments, the fastening end may couple to some other portion of the fish. In some embodiments, the fastener may include, without limitation a clamp, a clothes pin, a straight pin, a string, a hook, and the like. The fish may be positioned along the longitudinal axis of the quantifying scale. In some embodiments, the quantifying scale orients vertically so that gravity causes the fish to align vertically and parallel to the quantifying scale longitudinal axis.

In some embodiments, the proximal end, along with the fish, may be supported by a user or a stand so that gravity causes the distal end of the scale and the fish to hang downwardly, with the distal end of the fish terminating at a quantifying end along the length of the scale. The distal end of the fish terminates at a distance indicator located on the scale to identify the length of the fish. However, in one alternative embodiment, the scale and the fish may be aligned horizontally on a surface. The scale may be sufficiently flexible, and the fastener may be detachable so that the portable system and method for quantifying wild game may compact into a storable position when not in use.

These and other advantages of the invention will be further understood and appreciated by those skilled in the art by reference to the following written specification, claims and appended drawings.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the fish, from the proximal end to the distal end.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 1 is a perspective, downward-looking, view of a fish measuring device with a fastener and a measuring tape coupled thereto in accordance with the present invention;

FIG. 2 is a perspective, downward-looking, view of the fish measuring device of FIG. 1 with a fish attached thereto in accordance with the present invention;

DETAILED DESCRIPTION

Figure 3:
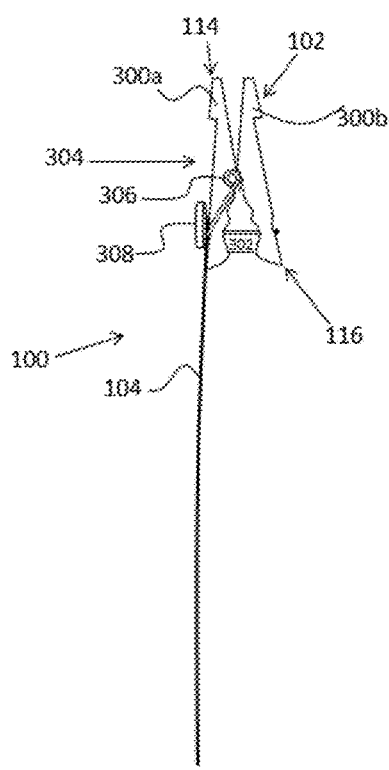
FIG. 3 is an elevational side view of the fish measuring device of FIG. 1 when in an open position showing the measuring tape in a first position.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1.

The present invention provides a novel and efficient device for measuring the length of wild game, specifically fish. Embodiments of the invention provide a fish measuring device that allows the fish to be held and supported, while simultaneously providing the length of this fish. Further embodiments of the present invention include an extremely inexpensive and portable device for measuring the length of a fish.

Referring now to FIG. 1, one embodiment of the present invention is shown in a perspective, downward-looking, view. FIG. 1 shows several advantageous features of the present invention, but, as will be described below, the invention can be provided in several shapes, sizes, combinations of features and components, and varying numbers and functions of the components. The first example of a fish measuring device 100 includes, as shown in FIG. 1, a fastener 102 and a measuring tape 104. With reference now to both FIGS. 1 and 2, the portable device 100 for quantifying the length of wild game, specifically a fish 200, is shown. The portable device 100, and method, provides a user the capability to support the fish 200 while simultaneously observing and recording the length of the fish 200. In some embodiments, the quantifying scale, or measuring tape 104, may include a flexible material having distance indicators 106 efficacious for determining a length or distance. Those skilled in the art, in light of the present teachings, will recognize that a standard rollup measuring tape 104 provides a portable and multipurpose solution for accurately and quickly measuring the length of the fish 200. In further embodiments, other quantifying scales may be utilized. The fish 200 can be seen having a proximal end 202 and a distal end 204, with the proximal and distal ends 202, 204 defining a fish length 206.

The measuring tape 104 may be oriented vertically with a proximal end 108, a distal end 110, and a length 112 separating the proximal and distal ends 108, 110. The measuring tape 104 is coupled to the fastener 102 to provide an efficient and effective device to contemporaneously support and measure the length 206 of the fish 200. In other embodiments, the measuring tape 104 may be curvilinear or planar when in the vertical orientation or may be oriented horizontally, if a user places it on a flat surface. In one embodiment, the distal end 110 of the measuring tape 104 is located at least at the distal end 204 of the fish 200 to expose the fish length 206. Suitable materials for the measuring tape 104 may include, without limitation, a ribbon of cloth, plastic, fiber glass, or a metal strip.

The quantifying scale 104 may display the distance indicators 106 along the measuring tape length 112 for quantifying the length 206 of the fish 200. In some embodiments, the multiplicity of distance indicators 106 may include a multiplicity of linear measurement markings in metric or United States measuring units, as shown in FIGS. 1 and 2. In other embodiments, the distance indicators 106 may be other indicia for referencing, measuring, and recording the length 206 of the fish 200. In further embodiments, the device 100 may have other empirical measurements to observe and record, without limitation, the girth and weight of the fish 200. The device 100 is specifically focused on measuring fish, but as those skilled in the art can appreciate, the device 100 can effectively measure other wild game, such as, and without limitation, fish, lobster, shellfish, rabbit, possum, fowl, turkey, and the like.

The fastener 102 includes a proximal end 114 and a distal end 116, opposite to the proximal end 114. As shown in FIGS. 1 and 2, the measuring tape 104 is coupled to the fastener 102 and extends downward and away from the distal end 116 of the fastener 102. In some embodiments, the fastener 102 attaches directly to the proximal end 108 of the measuring tape 104. In other embodiments, the tape 104 may be coupled to the fastener 102 somewhere along the measuring tape length 112. When in use, the fastener 102 attaches onto the proximal end 202 of the fish 200.

The fastener 102 may include a clamp sufficiently sized and dimensioned to securely attach to the proximal end 202 of the fish 200. In some embodiments, the proximal end 202 may include the mouth or a snout of a fish. In other embodiments, the fastener 102 may include, without limitation, a pin, a string, a hook, and the like. The fish 200 is coupled to the fastener 102 and is positioned along the measuring tape length 112. In some embodiments, the measuring tape 104 orients vertically so that gravity causes the fish 200 to align parallel to the longitudinal axis of the measuring tape 104. The fastener 102, along with the fish 200, may be supported by a user, as shown in FIGS. 1 and 2. As such, the user simply attaches the fish 200 and then views the side of the measuring tape 104 with the distance indicators 106 to obtain the fish length 206. The distal end 204 may include the fins of the fish 200 or may include other points of reference on the fish 200 the user determines to define the fish length 206. In one embodiment, the distance indicators 106 are located on one side of the tape 104, opposite the side where the fish 200 is held. In other embodiments, the distance indicators 106 are located on the side where the fish 200 is held, or are located on both sides. In other embodiments, the device 100 may employ the use of a stand to hold the fish.

Figure 4:
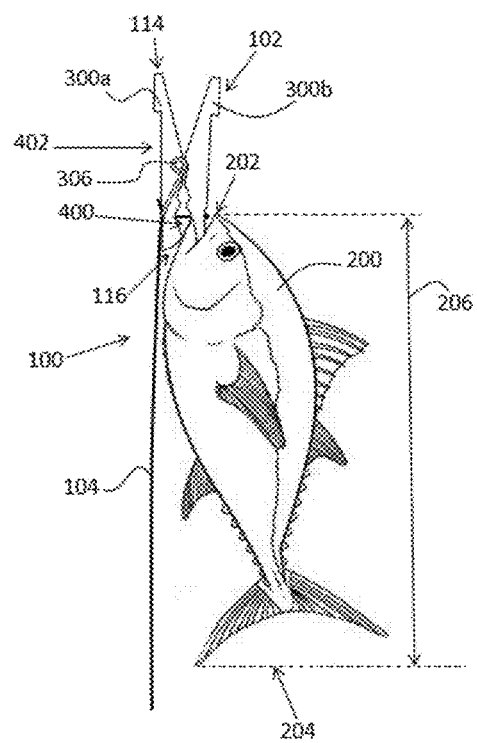
FIG. 4 is an elevational side view of the fish measuring device of FIG. 1 when in a closed position and with the fish attached thereto.

With reference now to FIGS. 3 and 4, the device 100 is shown in elevational side views. In one embodiment, fastener 102 is a clothes-pin like clamp, or other fastener, that has at least two members 300a-b coupled together to at least partially define a first space 302 separating the at least two members 300a-b when in an open position 304 (shown in FIG. 3). As described, the fastener 102 may also be a hook, vice-grip, or other fastener. Moreover, opposed to those known dense and heavy measuring devices, the device 100, specifically the fastener 102, advantageously is made from materials and components that resist the device from sinking into a body of water, should it fall into one. The at least two members 300a-b also are shown also at least partially defining a second space 400 separating the at least two members 300a-b when in a closed position 402 (shown in FIG. 4), with the second space 400 being less than the first space 302. The spaces 302, 400 separating the at least two members 300a-b are those spaces 302, 400 where the fish 200 is placed and securely attached and also generally includes the distal end 116 of the fastener 102. The spaces 302, 400 may also be defined by a spring 306 utilized to provide tension to the fish 200, while in the closed position 402. The spring 306 may also facilitate in coupling the measuring tape 104 to the fastener 102. As such, a user simply compresses the proximal end 114 of each of the at least two members 300a-b to place the fastener 102 in the open position and depresses them to place the fastener 102 in the closed position 402. As shown in FIG. 4, the proximal end 202 of the fish 200 is attached to the fastener 102 when in the closed position 402.

The fastener 102 clamps securely to the mouth or the snout of the fish 200. While a user holds the proximal end 114 and the fastener 102, with the fish 200 attached, gravity causes the fish 200 and the measuring tape 104 to align vertically and substantially parallel to one another. In other embodiments, the measuring tape 104 has one or more portions that bulge outwardly from the body of the fish 200. The distal end 204 of the fish 200 is then compared with one or more of the distance indicators 106 (shown in FIG. 1) to allow the fish length 206 to be observed and recorded.

Referring briefly back to FIG. 2, in one embodiment, the measuring tape 104 includes a zero mark 208 located along the measuring tape length 112, with the zero mark 208 being substantially aligned the proximal end 202 of the fish 200. The zero mark 208 advantageously allows the user to assure an accurate reading for the fish's length 206. The zero mark 208 may be one of the distance indicators 106 or may be another indicia or component attached to the measuring tape 104 or fastener 102. For example, in another embodiment, one or more portions of the fastener 102 protrude into the space where the fish 200 is attached to resist vertical movement of the fish 200. These portions of the fastener 102 would then be substantially aligned with one or more portions of the measuring tape 104 (relatively close to the proximal end 108 of the measuring tape 104) to ensure the fish length 206 is being accurately displayed.

Figure 6:
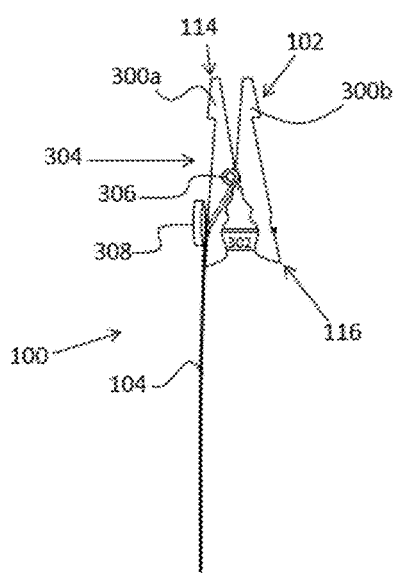
FIG. 6 is an elevational side view of the fish measure device of FIG. 1 when in an open position showing the measure tape in a second position.

Now referring back to FIGS. 1 and 2, as briefly described above, the measuring tape 104 may be flexible or foldable such that the device 100 is better equipped for stowing and transportation. With brief reference to FIGS. 3 and 6, in other embodiments, the measuring tape 104 may be substantially rigid, or may be retractable and extendable from a location adjacent the fastener 102, similar to a standard measuring tape. FIG. 3 depicts the measuring tape 104 in a first position, i.e., an extended position. FIG. 6 depicts the measuring tape 104 in a second position, i.e. a retracted position. Referring again to FIGS. 1 and 2, in other embodiments, the measuring tape 104 may have a weight coupled to the distal end 110 to keep it in a substantially vertical orientation. Further, the distance indicators 106 may have evenly-spaced lines along the measuring tape length 112 to accurately retrieve the fish's length 206. In other embodiments, the distance indicators 106 include evenly spaced lines and incremented numbers to facilitate the user in retrieving the fish's length 206. Moreover, a color of the distance indicators 106 may also be contrasted with a color of the measuring tape 104 of the user.

Figure 5:
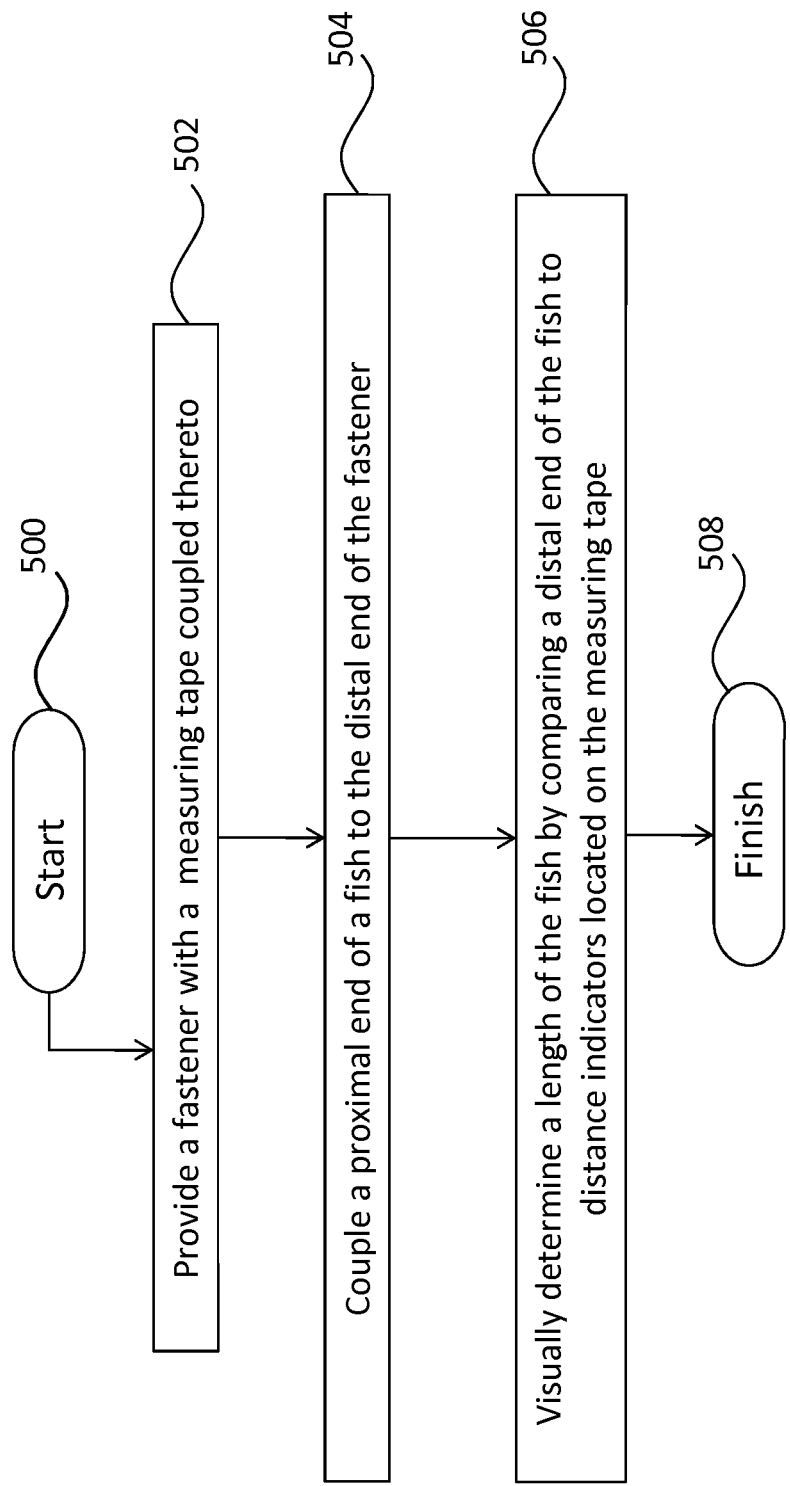
FIG. 5 is a process flow diagram of a method of measuring a fish in accordance with the present invention.

FIG. 5 illustrates a process flow diagram, representing the novel method of measuring the length 206 of a fish 200. The process starts at step 500 and immediately follows to the step 502 of providing a fastener 102 with a proximal end 114, a distal end 116, and a length separating the proximal and distal ends 114, 116 and a measuring tape 104 coupled to the fastener 102. The measuring tape 104, as disclosed herein, includes a proximal end 108, a distal end 110, and a length 112 separating the proximal and distal ends 108, 110. The measuring tape 104 also extends downward and away from the distal end 116 of the fastener 102 and has distance indicators 106 along the measuring tape length 112. The next step 504 includes coupling a proximal end 202 of a fish 200 to the distal end 116 of the fastener 102. As an alternative embodiment, the proximal end 202 of the fish 200 may be coupled to the distal end 116 of the fastener 102 such that the proximal end 202 of the fish 200 is substantially aligned with a zero mark 208 located along the measuring tape length 112. As the fish 200 and measuring tape 104 are both coupled together, a user then proceeds to the next step 506 of visually determining a length 206 of the fish 200 by comparing a distal end 204 of the fish to the distance indicators 106 on the measuring tape 104. The process concludes at step 508.

A fish measuring device has been disclosed that provides a user with the ability to advantageously measure the length of a fish, or other wild game, while concurrently supporting the fish. This is beneficially accomplished with minimal steps, and with a single device. Further, the present invention discloses a device and method for effectively and efficiently measuring the length of a fish with a household item, such as clothes pin.

What is claimed is:

1. A device for measuring the length of a fish comprising:
   a fastener:
      having a distal end and a proximal end, opposite to the distal end;
      attachable to mouth portion of the fish; and
      having a clothes-pin like fastening mechanism;
   a measuring tape permanently coupled to the fastener, the measuring tape:
      having a proximal end, a distal end, and a length separating the proximal and distal ends, the distal end being located at least at a distal end of the fish to expose a fish length;

having distance indicators along the measuring tape length; and extending downward and away from the distal end of the fastener.

2. The device for measuring the length of a fish according to claim 1, wherein the fastener further comprise:

at least two members coupled together, wherein the at least two members at least partially define a first apace separating the at least two members when in an open position and a second space separating the at least two members when in a closed position, the second space being leas than the first space.

3. The device for measuring the length of a fish according to claim 2, wherein:

the mouth portion of the fish is attached to the fastener when in the closed position.

4. The device for measuring the length of a fish according to claim 1, wherein the measuring tape further comprises:

a zero mark located along the measuring tape length, wherein the zero mark is substantially aligned mouth portion of the fish.

5. The device for measuring the length of a fish according to claim 1, wherein:

the measuring tape is foldable.

6. The device for measuring the length of a fish according to claim 1, wherein:

the distance indicators are evenly-spaced lines along the measuring tape length.

7. The device for measuring the length of a fish according to claim 1, wherein:

the distance indicators include evenly spaced lines and incremented numbers.

8. The device for measuring the length of a fish according to claim 1, wherein:

a color of the distance indicators contrasts with a color of the measuring tape.

9. The device for measuring the length of a fish according to claim 1, wherein the measuring tape further comprises:

a weight coupled to the distal end of the measuring tape.

10. A device for measuring the length of a fish comprising:

a fastener with:
  a clothes-pin like fastening mechanism;
  a distal end and a proximal end, separated by a length; and
  at least two members coupled together to at least partially define:
    a first space separating the at least two members when in an open position; and
    a second space separating the at least two members when in a closed position, the second space being less than the first space; and a measuring tape permanently coupled to the fastener, the measuring tape:
  having a proximal end, a distal end, and a length separating the proximal and distal ends;
  having distance indicators along the measuring tape length;
  having a zero mark disposed a non-zero distance from the proximal end of the measuring tape, the zero mark substantially aligned with a portion of the fastener along the fastener length; and
  extending downward and away from the distal end of the fastener.

11. The device for measuring the length of a fish according to claim 10, wherein:

the measuring tape is foldable.

12. The device for measuring the length of a fish according to claim 10, wherein:

the distance indicators are evenly-spaced lines along the measuring tape length.

13. The device for measuring the length of a fish according to claim 10, wherein:

the distance indicators include evenly spaced lines and incremented numbers.

14. The device for measuring the length of a fish according to claim 10, wherein:

a color of the distance indicators contrasts with a color of the measuring tape.

15. The device for measuring the length of a fish according to claim 10, wherein the measuring tape further comprises:

a weight coupled to the distal end of the measuring tape.

16. The device for measuring the length of a fish according to claim 10, wherein:

the measuring tape is retractable and extendable.

17. A method of measuring a fish comprising:

providing:
  a fastener having a clothes-pin like fastening mechanism, a proximal end,
  a distal end, and a length separating the proximal and distal ends; and
  a measuring tape permanently coupled to the fastener, the measuring tape:
    having a proximal end, a distal end, and a length separating the proximal and distal ends;
    having distance indicators along the measuring tape length; and
    extending downward and away from the distal end of the fastener;

coupling a mouth of a fish to the distal end of the fastener; and visually determining a length of the fish by comparing a distal end of the fish to the distance indicators on the measuring tape.

18. The method according to claim 17, further comprising:

coupling the mouth portion of the fish to the distal end of the fastener such that the mouth portion of the fish is substantially aligned with a zero mark located along the measuring tape length.

\* \* \* \* \*